United States Patent Office 2,990,810
Patented July 4, 1961

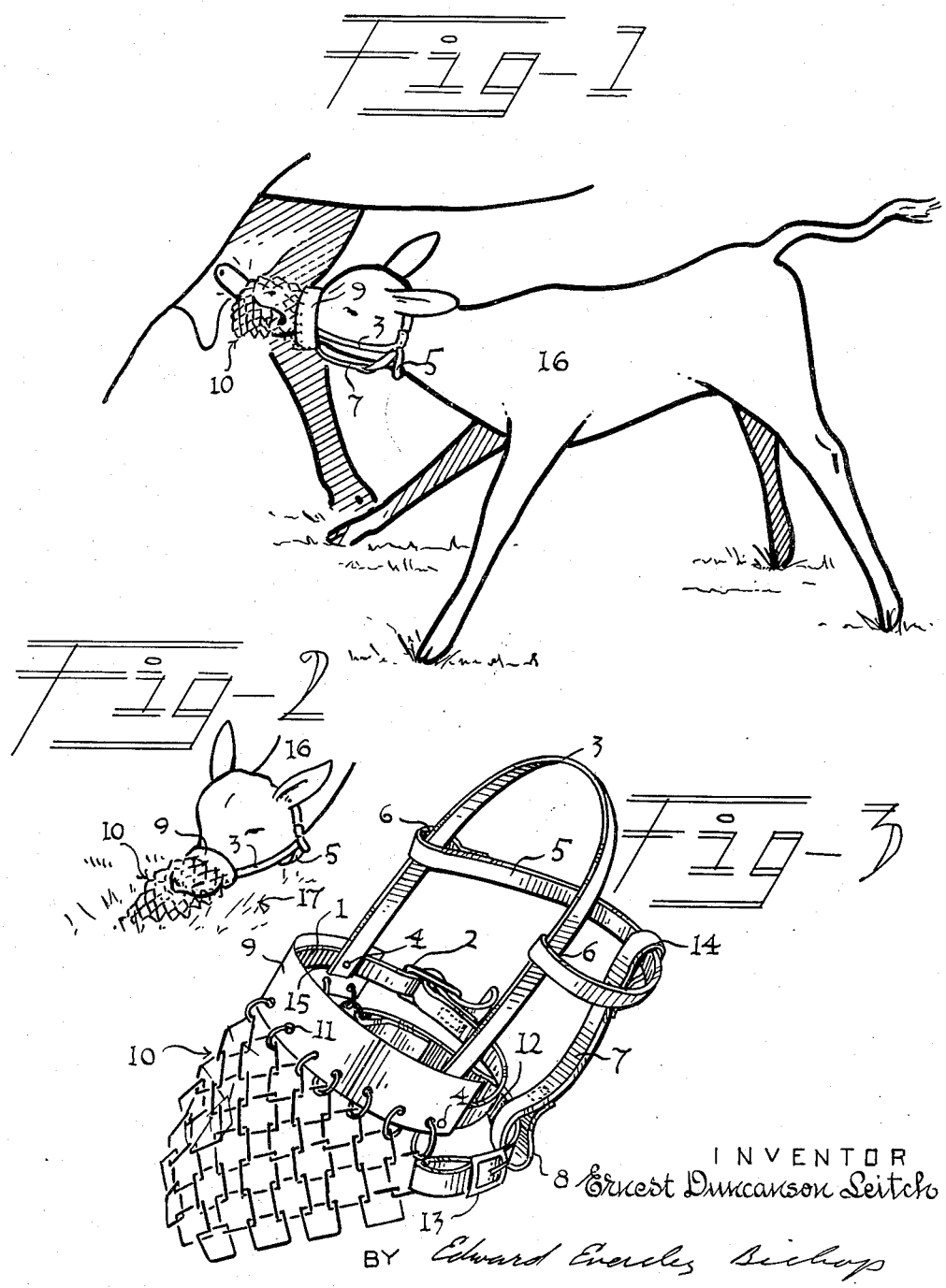

2,990,810
DEVICES FOR WEANING YOUNG ANIMALS
Ernest Duncanson Leitch, Brownvale, Alberta, Canada
Filed May 25, 1959, Ser. No. 815,375
1 Claim. (Cl. 119—131)

The principal object is to provide a weaning device attachable to the head of an animal that will cover the mouth of the animal to prevent suckling.

A further object is to provide a weaning device that will permit the animal to graze or eat in the normal manner without difficulty.

A further object is to provide an animal weaning device of a flexible material that renders it difficult for the young animal to move the device out of the way when it wishes to suckle.

A still further object is to provide an animal weaning device that is not painful to the young animal while being worn and that does not inflict pain or discomfort to the mother animal while the young animal is attempting to suckle.

A still further object is to provide an animal weaning device that is constructed from readily obtainable low cost parts.

Further objects of my invention will be understood from the following specification when read in conjunction with the drawings attached thereto. While I will describe one specific embodiment of my device, it will be obvious that this is only a preferred example and illustration and should not be construed as a limitation.

In the drawings:
FIGURE 1 illustrates the weaner in position on a young animal to prevent it suckling.
FIGURE 2 illustrates the animal eating in the normal fashion while the weaner is in place.
FIGURE 3 is an enlarged view illustrating the construction of the halter and weaning device.

As seen in the drawings, my improved weaning device is constructed with a halter having a nose band 1 and a head band 3 as well as a buckle 2 which secures the nose band 1 on the head of an animal. As is common, the head band 3 is secured to the nose band by rivets 4 or other like means and I have provided an additional band 5 connected loosely to the head band 3 at 6 with a linking band 7 coupled at its upper end 14 to the additional band 5 and having a loop 8 at its lower end. To provide rigidity to the nose band 1, I have included the stiffening member 9 of metal or other suitable material which is secured to the nose band by the aforementioned rivets 4 and, if necessary, additional rivets or other fastening means.

To prevent the stiffening member 9 or the ends of the rivets 4 from injuring the nose of an animal to which the halter is applied, I have formed the interior of the nose band with a suitable cushioning material 15, as for example, felt, sponge, rubber or the like and secured to the interior of the nose band by glue or other suitable fastening means.

The weaning portion of the apparatus comprises the muzzle designated generally by the numeral 10 and constructed of reticulated or chain mesh material and secured to the stiffening member 9 by way of the openings 11 in the stiffening member or by other suitable means if desired.

To ensure that the muzzle 10 is not moved easily by the animal when attempting to suckle, an additional strap 12 is connected at its ends to the muzzle 10 with a buckle 13 to allow the strap to be secured below the lower jaw of the animal to which the device is applied. It will be seen that the strap 12 extends through a loop 8 in the connecting strap 7 and that by this means, the halter and strap 12 are interconnected for positive action, while on the head of the animal.

The device, in use, would be constructed substantially in the form described and illustrated and would be secured on the head of a young animal as designated at 14. With the halter secured thereon in the usual manner, the muzzle 10 will then hang down over the nose of the animal to prevent the animal from suckling as illustrated in FIGURE 1 in the drawings. However, when the animal wishes to graze or eat in the normal fashion as illustrated at 17 in FIGURE 2 of the drawings, the reticulated muzzle 10 will hold sufficiently to allow such grazing.

It will thus be seen that I have provided an effective weaning device for young animals that has no sharp prongs or other protruding parts that can cause injury or discomfort either to the young animal or to the mother animal and which will allow the young animal to graze or feed in the normal fashion while preventing the animal from suckling, should it attempt to do so.

What I claim as my invention is:
An animal weaner for use with a conventional halter having a nose band to encircle the nose of the animal, and a head band and securing straps to secure the halter on the head of an animal, a stiffening member applied to the nose band, a pliable reticulated muzzle secured to the stiffening member to hang over the nose and mouth of the animal and a buckled strap secured to the pliant reticulated muzzle to pass under the lower jaw of the animal and restrict upward movement of the muzzle without preventing the animal grazing with the muzzle in place.

References Cited in the file of this patent
UNITED STATES PATENTS

| | | |
|---|---|---|
| 489,184 | Gillespie | Jan. 3, 1893 |
| 1,181,935 | Smokey | May 2, 1916 |
| 1,584,437 | Davis | May 11, 1926 |